US 9,157,230 B2

(12) United States Patent
Feinerman et al.

(10) Patent No.: US 9,157,230 B2
(45) Date of Patent: Oct. 13, 2015

(54) VACUUM INSULATED PANELS OF ARBITRARY SIZE AND METHOD FOR MANUFACTURING THE PANELS

(71) Applicants: Alan Feinerman, Skokie, IL (US); Prateek Gupta, Naperville, IL (US)

(72) Inventors: Alan Feinerman, Skokie, IL (US); Prateek Gupta, Naperville, IL (US)

( * ) Notice: Subject to any disclaimer, the term of this patent is extended or adjusted under 35 U.S.C. 154(b) by 0 days.

(21) Appl. No.: 13/768,182

(22) Filed: Feb. 15, 2013

(65) Prior Publication Data
US 2013/0216854 A1   Aug. 22, 2013

Related U.S. Application Data

(60) Provisional application No. 61/599,622, filed on Feb. 16, 2012.

(51) Int. Cl.
| | |
|---|---|
| *B23K 9/00* | (2006.01) |
| *E04B 1/80* | (2006.01) |
| *B23K 26/18* | (2006.01) |
| *B23K 26/24* | (2014.01) |
| *B23K 26/02* | (2014.01) |
| *B23K 26/16* | (2006.01) |
| *E04B 1/76* | (2006.01) |

(52) U.S. Cl.
CPC .............. *E04B 1/803* (2013.01); *B23K 26/023* (2013.01); *B23K 26/16* (2013.01); *B23K 26/18* (2013.01); *B23K 26/246* (2013.01); *E04B 2001/7691* (2013.01); *F25D 2201/14* (2013.01); *Y02B 80/12* (2013.01); *Y10T 428/12438* (2015.01)

(58) Field of Classification Search
CPC .. E04B 1/803; B23K 26/246; B23K 2201/18; B23K 2203/04; B23K 26/023; B23K 26/16; B23K 26/18; B23K 37/0435
USPC ....................... 228/135; 219/121.63
See application file for complete search history.

(56) References Cited

U.S. PATENT DOCUMENTS

| | | | | |
|---|---|---|---|---|
| 2,866,077 | A | * | 12/1958 | Morton et al. ........... 219/124.21 |
| 3,161,265 | A | | 12/1964 | Matsch |
| 4,847,467 | A | * | 7/1989 | Ausilio ..................... 219/121.63 |
| 5,091,233 | A | | 2/1992 | Kirby |
| 5,330,816 | A | | 7/1994 | Rusek |
| 5,364,577 | A | | 11/1994 | Cur |
| 5,989,371 | A | | 11/1999 | Nishimoto |
| 7,387,063 | B2 | | 6/2008 | Vu |
| 7,517,576 | B2 | | 4/2009 | Echigoya |
| 2004/0224120 | A1 | * | 11/2004 | Eyhorn et al. ................... 428/69 |
| 2005/0144904 | A1 | | 7/2005 | Veltkamp |
| 2007/0286981 | A1 | | 12/2007 | Feinerman |
| 2009/0217997 | A1 | | 9/2009 | Feinerman |
| 2012/0009376 | A1 | | 1/2012 | Rusek |

OTHER PUBLICATIONS

Single Iteration, Vacuum Insulated Panels.

* cited by examiner

*Primary Examiner* — Erin Saad
(74) *Attorney, Agent, or Firm* — Howard B. Rockman

(57) ABSTRACT

The present invention is a vacuum insulated panel (VIP) for increasing the thermal insulation surrounding a structure or volume, and a novel method for manufacturing the VIP. The VIP comprises at least two pieces of thin metal foil welded together adjacent the edges of said metal foil, said thin metal foil material defining the exterior of a sealed and gas evacuated vacuum enclosure; and a vacuum insulation panel core located between said at least two pieces of welded thin metal foil material, said vacuum insulation panel core located inside said sealed and gas evacuated vacuum enclosure.

13 Claims, 2 Drawing Sheets

VACUUM INSULATED PANELS OF ARBITRARY SIZE AND METHOD FOR MANUFACTURING THE PANELS

This is a continuation-in-part of provisional application Ser. No. 61/599,622 filed Feb. 16, 2012. Applicants claim priority to provisional application Ser. No. 61/599,622 to the extent allowed by law.

FIELD OF THE INVENTION

The present invention relates to the structure of a vacuum insulation panel of arbitrary size, the method of making the panel and ways of using the panel.

BACKGROUND OF THE INVENTION

Vacuum insulation panels (VIP) are panels that are poor thermal conductors and used where a temperature gradient needs to be maintained. These panels consist of a core that is a poor thermal insulator when placed in a low pressure environment (less than 100 microns), a getter (materials which adsorbs moisture and gas) and an outer envelope.

A vacuum insulated panel (VIP) is a form of thermal insulation made up of a nearly gas-tight enclosure surrounding a rigid core, from which the gas has been evacuated. Vacuum insulation panels are used to decrease the heat leakage from a structure or volume and therefore increase energy efficiency. Vacuum insulation panels are typically used inside refrigerator cabinets, freezers, vending machines, mobile refrigeration solutions, building construction, medical related fields, as well as in association with any products that require low energy loss due to heat transfer.

There have been changes to some of the materials that have been used in VIPs, particularly the "core material", such as shown in U.S. Pat. Nos. 5,330,816; 7,517,576 and U.S. patent application No. 2012/00009376 A1. However, current processes of manufacturing VIPs have remained the same for some time and one such process is typically set forth in U.S. Pat. No. 5,364,577:
1. The core material, usually an inorganic "board" or panel, is manufactured and placed in a dry environment.
2. The panel is then heated and placed into a large chamber that is able to go to the desired pressures.
3. A getter is then placed next to the core material.
4. The getter and the core material are heat sealed in an envelope. The envelope is made of aluminum, a form of metalized plastic, or thick (>0.003 inches) stainless steel.
5. Sometimes manufacturers will place some helium in the envelope prior to sealing for quality control purposes once the process is done.

Commercially available VIPs are clad in an aluminum/plastic foil laminate, and since aluminum has high thermal conductivity, edge losses can significantly reduce the effective insulation value of these VIPs. Both aluminum clad and metalized plastic envelopes are extremely fragile, and the requirement of a superstructure to attach a VIP to a building increases the retrofitting costs and represents additional thermal edge losses. The current method of manufacturing VIPs limits the maximum size of the VIPs. Gas is evacuated in the entire chamber where the VIP is present, and then the plastic VIP envelope is hot sealed all around the perimeter.

During the manufacturing of VIPs, the getter/desiccant in the enclosure is exposed to the manufacturing ambient and can lose effectiveness. The hermetic seal of the enclosure is by a plastic to plastic weld and is more permeable than a metal to metal weld. The current VIP envelopes are easily punctured, thus quickly reducing the effective R value of the VIP. One other problem with small VIPs is that the edge thermal losses can easily exceed the area thermal losses. For a VIP encased in 0.3 mil aluminum foil the significant thermal short at the edges of the VIP greatly reduces the effective R value of the VIP.

It is an objective of the present invention to create inexpensive hermetically sealed, puncture resistant vacuum insulated panels of arbitrary size and shape with high R value and reduce the VIPs' thermal edge losses. One other objective of the present invention is to create and deliver a non-evaporable getter with high porosity to the enclosure of the VIPs. A further objective is to minimize water permeation and corrosion of the VIPs.

SUMMARY OF THE INVENTION

Aspects and advantages of the disclosure will be set forth in part in the following description, or may be apparent from the description, or may be learned through practice of the disclosure.

The present invention is a vacuum insulated panel (VIP) for increasing the thermal insulation surrounding a structure or volume, and a novel method for manufacturing the VIP. The VIP comprises at least two thin pieces of metal foil material, such as stainless steel or titanium alloy, welded together initially adjacent to all but one of the edges of the metal foil, forming an enclosure between the pieces of metal foil. A support core material is disposed in the enclosure or an enclosure is placed around the outside of a core material. The opening between the non-welded edges of metal foil forming the enclosure are clamped together, and gas, such as air, is evacuated from the enclosure through an aperture in one of the pieces of metal foil, the aperture located adjacent the clamped opening. A molecule-absorbing getter is also inserted into the enclosure before, during or after the gas evacuation process. Upon the completion of the gas evacuation from the enclosure, the opening formed between the metal foil pieces is welded shut along a line to the interior of the evacuation aperture. The clamped portion of metal foil material, along with the gas evacuation aperture, is then removed from the completed VIP and recycled.

The VIP disclosed in this application is made by welding two thin stainless steel or titanium alloy foils together with a seam welder on three sides of the enclosure, clamping the remaining side in a fixture and evacuating the enclosure through an aperture in one of the metal foils.

DETAILED DESCRIPTION OF THE INVENTION

Figure 1:
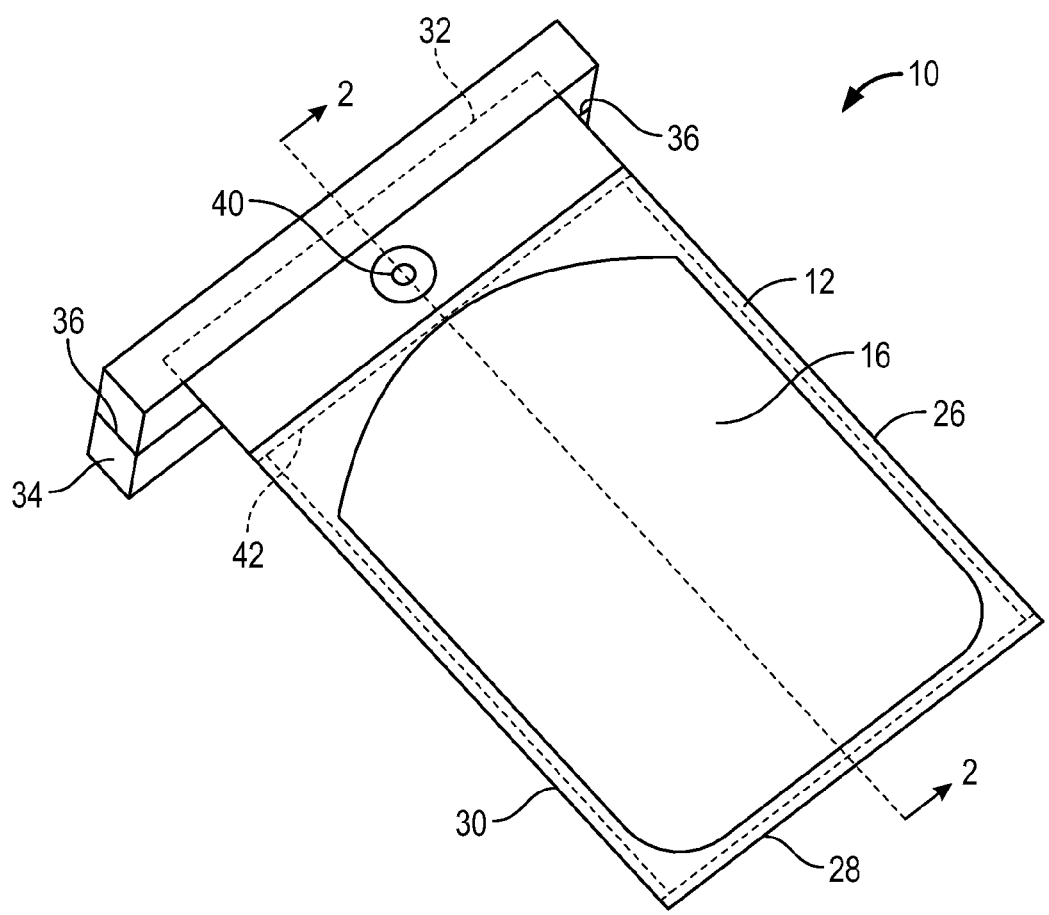
FIG. 1 is a front-side perspective view of an embodiment of the vacuum insulating panel of the present invention, shown prior to evacuation of gas from the enclosure formed by the two welded metal foil pieces.
Figure 2:
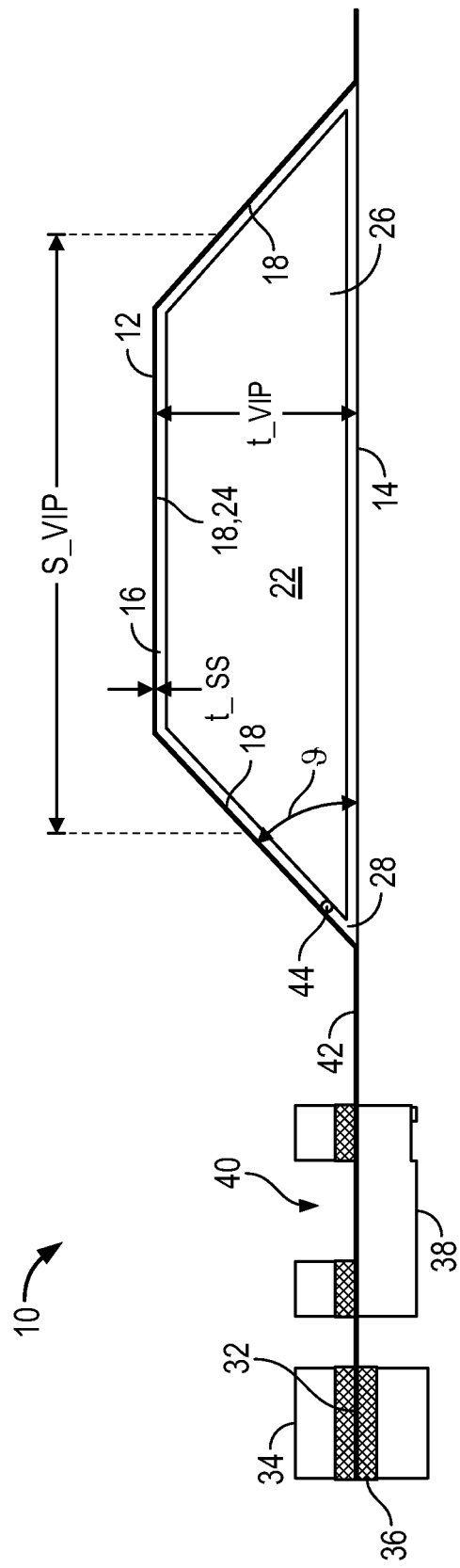
FIG. 2 is a cross-sectional schematic view of the vacuum insulating panel of FIG. 1, taken along line 2-2 of FIG. 1, showing a supporting core inside the enclosure.

The present invention relates to vacuum insulation panels that have arbitrary sizes. FIG. 1 shows a top perspective view of the metal foil enclosure prior to the VIP being formed. FIG. 2 is a cross-sectional view of the VIP along line 2-2 of FIG. 1.

Current aluminum/plastic clad VIPs are puncture prone, can have significant thermal losses at their edges, and lose R value when exposed to the environment. The advantage of certain thin metals with low thermal conductivity, high corrosion resistance, and high strength is that they have a higher puncture resistance than aluminum foil, or metalized plastic film, and that edge losses, which are proportional to the product of thickness and thermal conductivity of the edge material are reduced.

During their service life, VIPs will be subjected to outdoor conditions that include such potentially detrimental factors as high/low temperatures, humidity, and sun irradiation. In addition, direct interaction with atmospheric precipitation, wind, and creatures can also degrade the VIPs. Since aluminum foil has a thermal conductivity around 15 times greater than stainless steel, using stainless steel foil eliminates the puncture prone and high thermally conductive aluminum exterior of the current VIPs. Other non-corrosive foil materials with a low thermal conductivity can also be used, such as titanium alloy. Certain titanium alloy foils can have half the thermal conductivity of stainless steel, but are about ten times the price of stainless steel per square foot. Titanium alloy can be used in applications where the local price of energy justifies the higher cost, and transportation of valuable cargo such as vaccines, blood, or human organs for transplantation, where better temperature isolation is justified by the price of loss of cargo and the high cost of air shipment.

An illustrated embodiment of the VIP 10 in FIG. 1 is clad in 51 μm (0.002 inch) thick metal foils 12, 14 having exceptionally low corrosion rates. The foils 12, 14 are made from the following low thermal conducting materials, preferably having thermal conductivity lower than 26 W/(m×K); 321, 316 L or 304 L stainless steel; titanium alloys such as Ti (15 Mo-3 Nb-3 Al-2 Si), Ti (6 Al-5 Zr-0.5 Mo-0.25 Si), Ti (3 Al-2.5 V), and Ti (3 Al-2.5 V-0.05 Pd), or other low thermal conducting materials such as Hastelloy C™. The foils 12, 14 form the outer envelope 16 of the VIP 10, and also form the interior walls 18, 20 that create an enclosure 24 housing the supporting core 22. The core 22 aids in maintaining the shape of enclosure. The core 22 is adapted to support external pressures of approximately one atmosphere while minimizing the transfer of heat across the vacuum insulated panel.

The core 22 of the VIP 10 is also selected from materials having a high ratio of strength to thermal conductivity. In an embodiment of the present invention, the core 22 is made of fumed silica, a tensile structure or other mechanical structures. Fumed silica is produced by pyrolysis of $SiCl_4$, which is generated during the production of polycrystalline silicon. In an embodiment, the fumed silica of the illustrated embodiment is comprised of the raw materials: (1) 60% amorphous silica ($SiO_2$), (2) 35% ilmenite ($FeTiO_3$) as an opacifier, and (3) 5% ceramic fiber used to strengthen the material. $SiO_2$ has a lower thermal conductivity than stainless steel. The fumed silica core 22 maintains the shape of the outer envelope 16, as shown in FIG. 2.

The core 22 is inserted between metal foils 12, 14, and the two foils are welded together along single connected paths on three sides 26, 28, 30 of the envelope 16 by a seam welder, laser, plasma welder, brazing system or other welder as is known in the art. In other embodiments of the present invention, the foils can also be welded along multiply connected paths to create desired continuous interior paths to meet the users' needs. The remaining open side 32 is clamped in a fixture 34 to hermetically close the opening between the two foils 12, 14 along side 32. The fixture 34 can include two gaskets, and the remaining side 32 is clamped between two gaskets 36. An aperture 40 is located in one of the foils 12 a predetermined short distance from remaining side 32. A diffuser 38 is inserted beneath aperture 40 such that aperture 40 communicates with enclosure 24 formed between foils 12, 14.

Next, a vacuum tube (not shown) is connected to aperture 40 such as by mechanical or magnetic means as are known in the art, and the gas, such as air, is evacuated from enclosure 24. Supporting core 22 maintains the shape of VIP 10 as shown in FIG. 2. Upon completion of the evacuation process to the parameters described below, the VIP 10 is welded along weld line 42 shown in FIGS. 1 and 2 to complete the hermetic sealing of enclosure 24. Weld line 42 is located on the side of aperture 40 opposite fixture 34.

After the welding process along line 42 is complete, the fixture 34 is opened, and the foil material 12, 14 remaining between weld line 42 and remaining side 32 is trimmed and recycled. This completes the manufacturing process of VIP 10.

Other polygon shaped VIP 10 packages can be used, i.e. hexagon. Round shaped packages can also be welded by having a curved fixture 34 to seal the remaining side 32.

In the present invention, the enclosure 24 will be evacuated between about $10^{-2}$ torr and $10^{-6}$ with a dual stage roughing pump (not shown) in around 300 seconds through the aperture 40 prior to resistance weld sealing. The resistance welding occurs at between 7 m/sec and 1.3 cm/s. The evacuation will be through a 25 mm or larger inner diameter tube in the illustrated embodiment. Multiple apertures 40 can be used at one or more sides of the VIP 10 to speed up the pumping process if increasing the diameter of the pumping aperture 40 and minimizing diffuser 38 impedance does not reduce pumping time to a satisfactory level. Outgassing is minimized by baking out all components prior to use, and heating the VIP during the sealing process.

Maintaining the vacuum level in enclosure 24 is very important to the VIP 10 because if the vacuum level decreases, the R factor of the VIP decreases. During the step of evacuating the VIP, activated getters 44 (FIG. 2) will be added into the enclosure 24 through the evacuation aperture 40, just before the seal along weld line 42 is complete. The getter's role is to absorb chemical molecules that permeate through the metal foils 12, 14 or outgas from the enclosure 24 or the fumed silica core 22, thereby keeping the vacuum below $10^{-2}$ torr in the enclosure 24, and extending the VIP's lifetime to possibly several decades. The getters used in prior VIP construction degrade with time. This is primarily due to water vapor penetrating the aluminum/plastic exterior foil at 1-4 $ng/(m^2 \times s \times Pa)$. It has been observed that without a getter, a VIP's internal pressure can exceed $10^{-2}$ torr in a few minutes after completion, and the thermal insulation would deteriorate. Stainless steel and titanium alloys have a much lower permeability to water vapor and an upper limit was set by Norton at $10^{-13}$ torr×$L/(cm^2 \times s)$ at 25° C. with 0.025 inch thick material. Scaling this limit to 0.002 inch thick foil, the permeation would be below 12 $pg/(m^2 \times s \times Pa)$. A VIP made of stainless steel or titanium alloy would need much less getter and desiccant than a presently available VIP.

A typical getter 44 used for the present VIP invention is non-evaporable with a high specific surface area per gram of getter in the range of 800 to 2000 $meters^2/gm$ of getter. The getter material can also be selected from materials that meet the previous criteria and have a surface area per cubic centimeter of getter in the range of 300 to 3000 $meters^2/cubic$ centimeter of getter. A form of getter 44 is distributed by SAES with a capacity of 10 torr×L and may contain 0.17, 0.85, or 2.7 gm of $BaLi_4$, Cao, $Co_3O_4$ respectively. This represents about 2% of the capacity or approximately one H₂O molecule for every 50 getter molecules. Because the getter is placed into the enclosure 24 just before the enclosure 24 is completely sealed, the getter 44 can be stored prior to use at high temperature and in a high vacuum so that its full pumping capacity can be preserved for the VIP. The contact between the getter 44 and the ambient gas is greatly eliminated by inserting the getter into aperture 40 immediately prior to sealing the VIP along weld line 42.

Other getters can be used including Carbide Derived Carbon (CDC), and Calcium. CDC has numerous advantages as a getter for VIPs. CDC is inexpensive, and has extremely high porosity so it has a very high surface area. CDC has very high affinity for $H_2O$, $O_2$, $N_2$, and $H_2$. Properly prepared, CDC is non-toxic which minimizes waste disposal issues, and can be reused.

To obtain a calcium getter, calcium chloride powder is evacuated in a silica test tube and heated until it decomposes. After the chlorine gas is evolved, the calcium will be allowed to cool, and remain in vacuum until needed. If the calcium agglomerates after being reduced, the calcium chloride will be mixed with an inert powder such as $Al_2O_3$.

The getter 44 will be pressed into a pellet if necessary to facilitate delivery and/or localization within the VIP enclosure 24. A recess can be embossed into the walls of enclosure 24 to mechanically secure the getter pellet.

If necessary for storage before use without breaking the vacuum, the getter 44 will be poured into thin aluminum foil bags. These bags will be sealed by ultrasonic welding and their edges notched to facilitate opening under vacuum. They will in effect be similar to sugar packets used in restaurants, however they will contain a getter material that is prevented from reacting with the atmosphere by the aluminum foil which has negligible permeability. Keeping powders of the getter materials under ultra-high vacuum (UHV) conditions allows costs to be efficiently controlled.

If a leak appears on the clamped side along the edge 32 of VIP 10, the leak can be eliminated by seam welding along the welding line 42 after the diffuser 38 is inserted into the bag, or the leak can be made manageable by pumping on the edge leaks with an additional vacuum pump, seal, and aperture. The VIP 10 components will be kept in a nitrogen environment at an elevated temperature to minimize absorbed moisture.

After the VIP 10 is completely evacuated and welded on the remaining side 32, the foil edges of the VIP are trimmed along the welding lines adjacent sides 26, 28 and 30.

Figure 3:
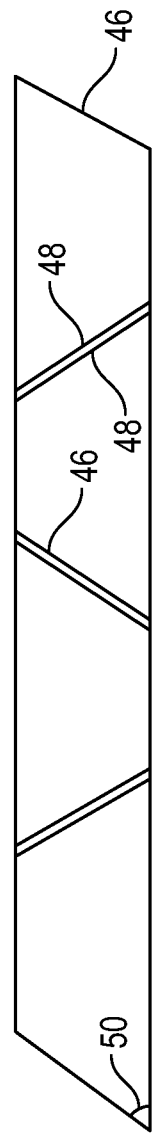
FIG. 3 is a schematic illustration of a plurality of several trapezoidal shaped vacuum insulting panels of the present invention assembled side by side.

Turning to FIG. 3, four VIPs with beveled lateral edges 46, 48 are shown tiled along their beveled edges 46, 48 with minimum gaps. The beveled edges configure the VIPs with a trapezoidal cross-section. Beveled edges 46 and 48 reduce heat loss by lengthening the thermal path of the VIP, and minimizing gaps between panels. The VIPs of the illustrated embodiment of the VIP have a uniformed bevel angle 50 of θ. Beveling the edges of the VIP lengthens the heat path by $$\frac{1}{\sin\vartheta}.$$

The perimeter of a square VIP is 4×S_VIP, (FIG. 2) and the heat flow along a beveled edge will be $$Q_{bevel\_edge} = K_{edge} \times 4 \times \text{S\_VIP} \times \text{t\_SS} \times \frac{\Delta T \times \sin\vartheta}{\text{t\_VIP}}$$

where $K_{edge}$ is the thermal conductivity of the edge material, and assuming the sheet metal foil material 12, 14 thickness is approximately unchanged. In making the VIPs, decreasing the bevel angle 50 and thinning the foil 12, 14 could further reduce the edge heat losses. The crossover size is where there are equal heat flows through the area and edge of a square VIP, and a smaller crossover size requires lower edge losses.

The heat flow through the area of a square VIP $Q_{VIP\_area}$ is given by $$Q_{VIP\_area} = K_{VIP\_area} \times \text{S\_VIP}^2 \times \frac{\Delta T}{\text{t\_VIP}}.$$

$K_{VIP\_area}$ is the effective thermal conductivity, the thermal conductivity $K_{VIP\_area}$ is around 0.0025 W/(m×K) with a fumed silica core, as long as the pressure in the enclosure 24 is below around $10^{-2}$ torr (1.3 Pa). The thermal conductivity of the 0.002 inch thick titanium alloy is $K_{Ti}$=8.3 W/(m×K) and this gives a crossover size of 1.6 feet if θ=45°. S_VIP²× t_VIP is the volume of the square VIP. The thickness of the VIP is t_VIP (FIG. 2). Researchers measured a maximum mass loss of 5 mg/(m²×year) from mechanically polished stainless steel samples exposed to precipitation with a pH of 2. This corresponds to a loss of 0.6 nm/year from the 51 μm thick stainless steel.

One embodiment of the presently disclosed VIP will be sealed within wax paper to prevent moisture from condensing on the foils 12, 14. Moisture touching the foils is undesirable since it can lead to corrosion, and possibly permeation through the foils in the form of atomic hydrogen.

The VIPs of the present invention can be manufactured with openings for wires and conduits, and in a variety of shapes. Except for the shape with trapezoidal cross-section mentioned above, other shapes include: square, rhomboid, circular, rectangular, and pillow-shaped. Unlike cellular plastic insulation, such as polyurethane foam, the present VIP is non-flammable, does not emit toxic gasses when exposed to a flame, and will not lose R value over decades since the VIP does not leak and there is no foaming agent to diffuse out of the material. Unprotected foam can lose 20% of its R value in 2 years.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural or method elements that do not differ from the literal language of the claims, or if they include equivalent structural elements with insubstantial differences from the literal languages of the claims.

What is claimed:

1. A method for making a vacuum insulated panel for decreasing heat leakage from a structure, comprising:
    enclosing a core of the vacuum insulation panel between two thin sheet metal foils, each thin sheet metal foil is thinner than 0.003 inch, has a thermal conductivity lower than 26 W/(m×K), the thin sheet metal foil material selected from the group consisting of stainless steel, titanium, and other low thermal conductivity metals;
    welding said two metal foils directly together continuously on three sides adjacent the edges of said metal foils, forming an enclosure between said metal foils, said enclosure having at least one opening communicating with an interior of said enclosure;

clamping the remaining open side of said two metal foils together;

evacuating gas from the enclosure through said opening; and welding the remaining open side of said two metal foils together after the enclosure formed by said two metal foils has been evacuated of gas.

2. The method of claim 1, further comprising:

removing the portion of said two metal foils disposed on the outside of the weld of said remaining open side of said two metal foils, after said remaining open side has been welded.

3. The method of claim 1, wherein:

said two metal foils are welded together using a welder selected from the group consisting of a seam welder, a laser, a plasma welder and a brazing system.

4. The method of claim 1, wherein:

said two metal foils are welded together to create a continuous gas tight seam around said enclosure after gas has been evacuated from said enclosure.

5. The method of claim 1, wherein said method comprising:

delivering a getter to the interior of said enclosure through said opening of the two metal foils immediately prior to welding the remaining side of said two metal foils.

6. The method of claim 1, wherein:

said at least one opening comprises multiple orifices adapted at one side of said enclosure to increase the speed of gas evacuation.

7. The method of claim 1, wherein:

said at least one opening comprises multiple orifices located at different sides of said enclosure to increase the speed of gas evacuation.

8. The method of claim 1, further comprising:

pumping edge leaks with an additional vacuum pump when there is a leak on said clamped remaining side along the edge of the enclosure.

9. The method of claim 1, wherein: said enclosure comprises arbitrary sizes and shapes, selected form the group consisting of square, trapezoidal, rhomboid, circular, rectangular, and pillow-shaped.

10. The method of claim 1 further comprising: welding said two metal foils together along single connected or multiple connected paths.

11. The method of claim 1 wherein said core of the vacuum insulation panel is composed of material selected from the group consisting of fumed silica, a tensile structure, and mechanical structures.

12. The method of claim 1 wherein said core of the vacuum insulation panel is adapted to support an external pressure of at least one atmosphere while minimizing the transfer of heat across the vacuum insulated panel.

13. A vacuum insulated panel for decreasing heat leakage from a structure prepared by a process comprising the steps of:

enclosing a core of the vacuum insulation panel between two thin sheet metal foils, each thin sheet metal foil is thinner than 0.003 inch, has a thermal conductivity lower than −26 W/(m×K), the thin sheet metal foil material selected from the group consisting of stainless steel, titanium, and other low thermal conductivity metals;

welding said two metal foils directly together continuously on three sides adjacent the edges of said metal foils, forming an enclosure between said metal foils, said enclosure having at least one opening communicating with an interior of said enclosure;

clamping the remaining open side of said two metal foils together;

evacuating gas from the enclosure through said opening; and welding the remaining open side of said two metal foils together after the enclosure formed by said two metal foils has been evacuated of gas.

* * * * *